United States Patent
Zhao et al.

(10) Patent No.: US 9,657,191 B2
(45) Date of Patent: May 23, 2017

(54) LOW ODOR REACTIVE METHACRYLATE COMPOSITION FOR FAST ROOM TEMPERATURE CURING FLOOR COATING FORMULATIONS

(71) Applicant: Dur-A-Flex, Inc., East Hartford, CT (US)

(72) Inventors: Ming Zhao, East Longmeadow, MA (US); David Royston Hughes, Fairfield, CT (US); Murty Venkata Bhamidipati, Simsbury, CT (US)

(73) Assignee: Dur-A-Flex, Inc., East Hartford, CT (US)

( * ) Notice: Subject to any disclaimer, the term of this patent is extended or adjusted under 35 U.S.C. 154(b) by 155 days.

(21) Appl. No.: 14/584,344

(22) Filed: Dec. 29, 2014

(65) Prior Publication Data

US 2015/0191622 A1   Jul. 9, 2015

Related U.S. Application Data

(60) Provisional application No. 61/923,413, filed on Jan. 3, 2014.

(51) Int. Cl.
*C09D 151/00* (2006.01)
*E04F 15/12* (2006.01)

(52) U.S. Cl.
CPC .......... *C09D 151/003* (2013.01); *E04F 15/12* (2013.01); *Y10T 428/264* (2015.01); *Y10T 428/31935* (2015.04)

(58) Field of Classification Search
CPC .................................................. C09D 151/003
See application file for complete search history.

(56) References Cited

U.S. PATENT DOCUMENTS

| | | | |
|---|---|---|---|
| 3,847,771 A | 11/1974 | McGinniss | |
| 3,915,824 A | 10/1975 | McGinniss | |
| 3,953,408 A * | 4/1976 | Hosoi | G03F 7/027 525/260 |
| 4,234,662 A | 11/1980 | Pastor et al. | |
| 4,343,919 A * | 8/1982 | Tefertiller | C08F 8/00 428/425.1 |
| 4,587,313 A | 5/1986 | Ohta et al. | |
| 4,665,106 A | 5/1987 | Ohta et al. | |
| 5,003,026 A | 3/1991 | Ehrhart et al. | |
| 5,384,341 A | 1/1995 | Itagaki et al. | |
| 5,470,425 A | 11/1995 | Dischoe | |
| 5,741,543 A | 4/1998 | Winslow et al. | |
| 5,985,990 A | 11/1999 | Kantner et al. | |
| 6,165,563 A | 12/2000 | Chandran et al. | |
| 6,448,301 B1 | 9/2002 | Gaddam et al. | |
| 6,664,306 B2 | 12/2003 | Gaddam et al. | |
| 7,049,355 B2 | 5/2006 | Quis et al. | |
| 8,007,585 B2 | 8/2011 | Yoshii et al. | |
| 8,277,944 B2 | 10/2012 | Matsumoto et al. | |
| 2002/0164434 A1 | 11/2002 | Taruin et al. | |
| 2004/0265730 A1* | 12/2004 | Takahashi | G03F 7/0047 430/270.1 |
| 2006/0154173 A1* | 7/2006 | Ishigaki | G03F 7/0048 430/270.1 |
| 2009/0082485 A1 | 3/2009 | Slark et al. | |
| 2012/0148833 A1 | 6/2012 | Cao et al. | |

* cited by examiner

*Primary Examiner* — Megan McCulley
(74) *Attorney, Agent, or Firm* — Joseph Suhadolnik

(57) ABSTRACT

A UV or thermally curable, low odor, liquid coating composition, which readily applied at room temperature without heating comprising:

a) a reactive acrylic based polymer comprising pendant acrylate or methacrylate groups; b) reactive unsaturated monomers, typically acrylic or methacrylic monomers, often polyfunctional monomers; c) a thermal or UV activated radical initiator; and in many embodiments, d) an inert and non-polar wax or viscous oil, e.g., a paraffinic material, and e) optionally a tertiary amine, for example, a tertiary amine accelerator used with a thermally activated radical initiator. Also provided are substrates coated with the composition of the invention, for example, flooring coated with the inventive composition.

20 Claims, No Drawings

LOW ODOR REACTIVE METHACRYLATE COMPOSITION FOR FAST ROOM TEMPERATURE CURING FLOOR COATING FORMULATIONS

This invention provides low odor, liquid coating compositions comprising a reactive acrylate and/or methacrylate based polymer that comprises pendant reactive acrylate or methacrylate groups, useful, e.g., for floor and construction coating formulations, which compositions can be cured either thermally or by UV at low temperatures, e.g., room temperature.

BACKGROUND

The processing of reaction resins based on methyl (meth) acrylate floor coatings is normally associated with a strong offensive odor and significant air born toxicity. The low flash point and high volatility of methyl (meth)acrylate monomer also add costs when it is handled during manufacturing, packaging, transportation and application.

Polymerization of MMA monomer in the mixed solution of non-reactive bead polymer of methacrylates with tertiary amine or similar derivatives as amine synergist, benzoyl peroxide as initiator and wax as an oxygen barrier to form a Methacrylate floor coating resin has been broadly practiced in flooring and construction industry. The advantage of this technology is that it can be completely cured in one hour while the other coatings will need much longer time, typically at least six hours or more. Cured MMA film also exhibits excellent chemical resistance and abrasion resistance. However, many such coatings have issues with odor, volatility, toxicity and flammability.

Low-odor (meth)acrylate coating systems are known, consisting largely of slightly higher MW monomers as incorporation of larger compounds such as higher oligomers and polymers often complicate application of the coating, especially in low solvent or solvent free coatings. Controlling the odor, in many instances, also somewhat lowers the toxicity as many of the volatiles responsible for the odor also contribute to the toxicity. However, to achieve 100% cure while maintaining the good balance between the work time and curing time is difficult and health risks often remain a concern even for these low odor systems. The need for a low-odor, cold-curing (meth)acrylate reaction resin for a floor coating that has especially low health risks during application remains.

Historically, coating materials comprising thermoplastic and thermosetting polymers were applied from solvents that were subsequently removed by evaporation. However, changing safety, health and environment legislation have restricted solvent emissions and solvent-free coating materials and lacquers have become known.

UV curable coatings offer very fast compared to other methods, such as moisture curing or thermal curing. Typical UV lacquers or varnishes are applied at room temperature and often consist of epoxy acrylate, polyester acrylate or urethane acrylate oligomers combined with acrylate functional monomers in the presence of a photoinitiator. Under suitable UV wavelengths, the photoinitiators produce free radicals which polymerize the acrylate functional groups to produce a cross-linked network. The relatively high concentrations of low viscosity reactive monomers often employed to reduce the viscosity of the coating composition in order to get good flow and leveling at room temperature can penetrate into porous substrates such as wood and become too deep to be cured by UV radiation. Uncured monomer in the pores of substrates can give safety, health and environmental problems, e.g., when the materials are cut or sanded.

The use of a solvent-free reactive hot melt layer based on polyurethane and hardened by atmospheric humidity has been suggested. While this method is advantageous in that desired layer thicknesses can be applied in a single operation, curing takes at least several days to occur because it depends on moisture and the coated part cannot be processed or packaged rapidly.

Hot melt compositions that can be cured through both radiation and moisture or by applying a UV curable lacquer on top of the moisture curable hot melt are known wherein the coating is partially cured by UV radiation, typically the top layer of portion of the coating, but full cure of the full coating may still take several days. Also, required heating the hot melt composition prior to application limits thermal stability resulting in moisture from the atmosphere penetrating the composition and reacting with the isocyanate groups. This leads to an increase in molecular weight while on the roller and application problems, e.g., stringing or filament formation that can produce fouling of substrates/application equipment.

US 2009/0082485 discloses radiation curable hot melt coating compositions and articles comprising them. Typical compositions comprise a polymer component with number average molecular weight (Mn)>2,000 g per mole comprising polyurethane and/or poly(meth)acrylate segments and at least one functional group polymerisable under UV radiation; an oligomeric component with Mn=500 to 5,000 g per mole and at least two functional groups polymerisable under UV radiation; at least one photoinitiator; and optionally either in place of or in addition to the oligomeric component, a monomer component with Mn=100 to 1,000 g per mole and at least one functional group polymerisable under UV radiation.

U.S. Pat. No. 7,049,355 discloses a low odor thermal curable floor coating formulation comprising low volatile methacrylate monomers, a non-reactive bead polymer, a paraffin and/or wax, and a redox system, containing an accelerator and a peroxide catalyst or initiator in an amount adequate for cold-curing the methacrylate monomers.

Despite advancements made, compositions with lower odor, less toxicity, decreased flammability, faster curing and better balance between working time and curing time are needed. These improvements can be found in the coating compositions of the present invention along with the production of coating films with better chemical and physical properties.

SUMMARY OF THE INVENTION

The invention provides a curable, low odor, liquid coating composition, which is readily applied at room temperature without heating, useful, for example, as a coating for flooring applications, comprising:
a) a reactive acrylic based polymer comprising pendant acrylate or methacrylate groups
b) reactive unsaturated monomers, typically acrylic or methacrylic monomers, often polyfunctional monomers;
c) a thermal or UV activated radical initiator, and in many embodiments;
d) an inert and non-polar wax or viscous oil, e.g., a paraffinic material, and
e) optionally a tertiary amine, for example, a tertiary amine accelerator used with a thermally activated radical initiator.

The coating composition typically comprises other components common in such coatings, e.g., colorants, fillers, stabilizers and additives, typically however, no solvents, e.g., volatile solvents which are removed by evaporation after application before or during cure.

Component a) of the inventive composition is a reactive acrylic based polymer. "Acrylic based polymer" or "acrylate and/or methacrylate based polymer" as used herein describes a polymer or copolymer wherein at least 50 mole % of the monomers used in preparing the polymer are acrylic or methacrylic ester or acid monomers. Such polymers are also referred to herein as the reactive acrylic polymer of the invention.

The reactive acrylic polymer of the invention is readily prepared by reacting glycidyl acrylate and/or glycidyl methacrylate with a co-polymer prepared, typically via radical polymerization of a monomer mixture comprising acrylate, methacrylate, acrylic acid and/or methacrylic acid monomers, wherein at least of portion of the monomers are selected from acrylic acid and/or methacrylic acid.

One embodiment of the invention provides a thermally curable coating composition comprising a) the reactive acrylic polymer, b) the reactive monomer, c) a thermally activated radical initiator, d) a paraffin wax, and e) a tertiary amine accelerator. Another embodiment provides a UV curable coating composition comprising a) the reactive acrylic polymer; b) the reactive monomer; and c) a UV activated radical initiator.

The coatings of the invention can be applied to a wide variety of materials, wood, concrete, masonry, metals, plastics, composites and the like, and are very effective as coatings for flooring including coating a fully installed floor, or coating materials that are used in assembling a floor such as tiles, concrete slabs, planks, polymeric sheets etc.

The present invention also discloses the synthetic routes and methods to produce reactive the reactive acrylic polymers of the invention and processes for thermal and UV curing of the coating composition.

DESCRIPTION OF THE INVENTION

The coating composition of the invention is a liquid at room temperature having a viscosity at 25° C. of less than about 50,000 cps, generally less than 10,000 cps, for example from about 50 cps to about 50,000 cps, for example from 50 cps to about 10,000 cps at 25° C., and in certain embodiments the viscosity is from 50 cps to 5,000 cps or from 50 cps to 2,500 cps. It is readily applied to a substrate without heating by conventional, means, e.g., brush, roller, squeegee, trowel, spray, and the like. The liquid coating composition of the invention can also be broadcasted with sand, quartz, chips, flakes, etc. while it is cured forming a decorative coatings. The coating is typically 100% active, meaning that no solvents are employed.

Single coating layers can be applied or multiple coating layers may be used. Thin films, e.g. 0.5 to 500 microns, and thick films can be prepared, for example, films builds of 60 mils and higher have been prepared by thermal curing a single application layer of the instant composition, and excellent results in UV curing films 15-20 mils have been obtained. Thicker single application film builds are also possible, but multiple layers of the coating are often applied when thicker coatings are desired. For example, by applying multiple coating layers, films of 50 mils, 75 mils, 100 mils or 200 mils etc. can be prepared.

The liquid coating composition of the invention, for example, typically comprises a) from 5 to 85 wt %, e.g., from 5 to 40 wt %, based on the weight of components a) through e), of an acrylic based polymer comprising acrylate or methacrylate pendant groups;

b) from 5 to 94 wt %, e.g., from 50 to 89 wt % of one or more reactive monomers having a boiling point at 1 atmosphere of greater than 100° C., wherein at least a portion of the reactive monomers, in many embodiments at least 50 mole % and up to 100 mole % of the reactive monomers, are selected from the group consisting of compounds of formula I,

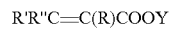
R'R''C=C(R)COOY

And compounds comprising two or more reactive groups of formula II

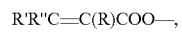
R'R''C=C(R)COO—, wherein R, R' and R'' are each individually selected from H, $C_{1-12}$ alkyl, $C_{1-6}$ alkyl substituted by phenyl, $C_{1-6}$ alkyl substituted by phenyl substituted by one or more $C_{1-4}$ alkyl, phenyl, and phenyl substituted by one or more $C_{1-4}$alkyl, and Y is selected from H, $C_{1-12}$ alkyl, and $C_{1-6}$ alkyl substituted by phenyl, OR, NRR', or oxirane;

c) 0.1 to 15 wt %, e.g., 0.1 to 10 wt % or 0.1 to 5 t % of a thermally activated or UV activated radical initiator, d) 0 to 15 wt %, 0.1 to 10 wt %, e.g. 0.1 to 5% or 0.1 to 3 wt % of a non-polar, inert wax or oil, and e) 0 to 5 wt %, e.g., 0.1 to 5 wt % or 0.1 to 3 wt % of a tertiary amine, wherein the coating composition has a viscosity of 50,000 cps or less at 25° C., e.g., 20,000 cps or less, such as 10,000 cps or less at 25° C., and in some embodiments 7,500 cps or less, 5,000 cps or less or 2,500 cps or less at 25° C. Often the viscosity of the liquid coating composition is at lease 50, 100, or 500 cps at 25° C.

Most embodiments will further comprise other additives typically found in such compositions at typical amounts, but generally there will be no, or minor amounts, e.g., less than 10 wt %, typically 5 wt % or less than 2 wt %, of polymers that do not meet the description herein of component a), for example, reactive polyurethanes, non-reactive bead polymers etc., are typically excluded.

Component a)

The coating composition of the invention comprises 5 to 85 wt %, typically from 5 to 40 wt percent of the reactive acrylic polymer. For example, in most embodiments the coating composition of the invention comprises at least 5 wt %, e.g., at least 10, 15, 20 or 25 wt %, and up to 30, 35, 40, 50, 60 70 or 80 wt %, based on the total weight of components a) through e) of the composition, of the acrylic polymer comprising pendant acrylate or methacrylate groups.

The reactive polymer of the invention is prepared by forming a first polymer by radical polymerization using standard methods, of a mixture comprising one or more acrylic and/or methacrylic ester and at least one of a acrylic and/or methacrylic acid, followed by reacting the first polymer with an epoxyalkyl acrylate or methacrylate ester, e.g., glycidyl acrylate and/or glycidyl methacrylate. It is believed that the epoxy group of the glycidyl acrylate and/or glycidyl methacrylate reacts with free carboxylic acid groups present in the first polymer. Typically the amount of glycidyl acrylate or methacrylate added to the first polymer is equal to, or less than, the amount of acrylic and/or methacrylic acid monomer incorporated into the first polymer, however, it may in some embodiments it may be beneficial to add a larger amount of the glycidyl acrylate. The reactive polymer is isolated by removing solvent via a low temperature solvent stripping process.

Generally, at least 50 mole %, e.g. 60, 70, 80, 90, or 95 mole % of the monomer mixture is made up of acrylic and/or methacrylic esters and acids. The amount of acrylic and/or methacrylic acid monomer in the first polymer used in preparing the reactive polymer of the invention ranges from 0.1 wt % to 25 wt % or 0.1 wt % to 20 wt %, e.g., 0.1 to 15 wt %, typically at least 1 wt % often from 1.5 wt % to 15% wt % of the monomer mixture.

Alternately, glycidyl acrylate and/or glycidyl methacrylate can be reacted with a commercially obtained acrylate first polymer comprising a portion of carboxylic pendant groups.

In many embodiments, the reactive polymer has a Tg of, e.g., from −50° C. to +100° C., e.g., −25° C. to +60° C.

Acrylate and methacrylate esters useful in the preparation of the first polymer include methyl analogues, e.g., crotonate and isocrotonate esters, as well as di-, tri-, and tetra-esters, for example, compounds of Formula Ia and IIa

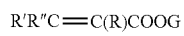     Ia

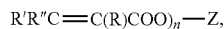     IIa wherein R, R' and R" are independently selected from methyl and hydrogen;

G is $C_{1-18}$, $C_{1-12}$, $C_{1-8}$, or $C_{1-6}$ straight or branched chain saturated alkyl; $C_{2-12}$, $C_{2-8}$, $C_{2-6}$ straight or branched chain unsaturated alkyl; said alkyl or unsaturated alkyl substituted by OH, OR, $NR_2$ and/or interrupted by one or more carbonyl, carboxylate, O or NR; $C_{3-12}$ epoxyalkyl; phenyl; phenyl substituted by alkyl, alkoxy or amino; benzyl; benzyl substituted by alkyl, alkoxy or amino; phenethyl; phenethyl substituted by alkyl, alkoxy or amino alcohol; and the like; n is 2 or 3, e.g., 2; and Z is straight or branched chain $C_{2-12}$alkyl or $C_{2-12}$alkyl substituted by OH, OR, or $NR_2$ and/or interrupted by one or more carbonyl, carboxylate, O or NR, e.g., $C_{4-24}$ alkyl or $C_4$-24alkyl substituted by OH, OR, $NR_2$ and/or interrupted by one or more carbonyl, carboxylate, O or NR.

Specific monomers of formula Ia useful in preparing the first polymer include for example methyl, ethyl, propyl, butyl, pentyl, hexyl, heptyl, octyl, nonyl, decyl, dodecyl, octadecyl, phenyl, benzyl, hydroxyethyl, hydroxypropyl, aminoethyl, aminopropyl, glycidyl, ethoxyethyl, diethoxyethyl, propoxypropyl, acrylate or methacrylate esters and the like including alkyl isomers such as iso-propyl esters, tert-butyl esters, ethylhexyl esters etc.;

Specific monomers of formula IIa useful in preparing the first polymer include di- or tri-acrylate or methacrylate esters of ethanediol, propanediol, butanediol, hexanediol, octanediol, nonanediol, decanediol, eicosanediol, diethylene glycol, triethylene glycol, tetraethylene glycol, dodecaethylene glycol, tetradecaethylene glycol, propylene glycol, dipropylene glycol, and tetradecapropylene glycol, trimethylopropane, glycerin etc.

In most embodiments, monomers of formula Ia will comprise the majority or the entirety of the ester monomers, e.g., 60, 70, 80, 90 wt % or more, including for example, methyl acrylate, ethyl acrylate, propyl acrylate, butyl acrylate, ethylhexyl acrylate and the like.

Component a) can also contain smaller amounts, i.e., less than 50 mole %, of other monomers that are copolymerized with the above-indicated acrylates etc., for example, acrylamides, vinyl esters, vinyl chlorides, vinyl ethers, vinylidene chlorides, vinyl acetates, styrenes, maleic acid derivatives, dienes and the like, including, for example:

1,3-butadiene, isobutylene, ethylene, propylene, vinyl chloride, tetrafluoroethylene, divinylbenzene, 4-vinylbiphenyl, vinylidene chloride, 4-vinylpyridine, chloroprene, vinyl 2-ethylhexanoate, vinyl acetate, cyclohexyl vinyl ether, dodecyl vinyl ether, ethyl vinyl ether, isobutyl vinyl ether, isopropyl vinyl ether, octadecyl vinyl ether, octyl vinyl ether, pentyl vinyl ether, phenyl vinyl ether, propyl vinyl ether, n-butyl vinyl ether, t-butyl vinyl ether, vinyl pyrrolidinone, styrene, alpha-methylstyrene, o, m, or p-methyl styrene, p-isopropylstyrene, p-t-butylstyrene, o, m or p-chlorostyrene, o p-bromostyrene, p-fluorostyrene, allyl alcohol, allylglycidal ether, allylphenyl ether, sodium 1-allyloxy-2 hydroxypropylsulfonate, dimethylisopropenyloxazolone, acrylamide, acetoneacrylamide; methacrylamide, dibutylacrylamide, methylolacrylamide octylacrylamide, octadecylacrylamide, t-butylacrylamide, sodium acrylate, sodium methacrylate, 2-Cyanoethyl Acrylate, acrylic anhydride, methacrylic anhydride, acrylonitrile, methacrylonitrile, acryloyl chloride, methacryloyl chloride, acrylanilide, citraconic anhydride, itaconic acid, itaconic anhydride, diethyl fumarate, dimethyl fumarate, ethyl fumarate, polyethylenefumarate, maleic acid, maleic anhydride, maleimide, butyl maleimide, methyl maleimide, ethyl maleimide, hexyl maleimide, octylmaleimide, propyl maleimide, maleonitrile, methyl maleate, dibutyl maleate, diallylmaleate, ethyl maleate, and the like including isomers and variants obvious to one skilled in the art.

In many embodiments of the invention there is no particular limit of the MW of the reactive acrylic polymer, for example, polymers with an average molecular weight of from Mn 500 to 500,000 have been used, and in some embodiments larger polymers may be employed.

In certain particular embodiments of the invention, for example, in certain photo-cured compositions, the reactive acrylic polymer has an average molecular weight of less than Mn 2,000 for example, an average molecular weight of Mn 1,900 or less, e.g., 1,800 or less, 1,700 or less or 16,00 or less, e.g. from 500 to 1,900.

Component b)

The coating composition of the invention comprises from 5 to 94 wt %, typically from 50 to 89 wt %, of one or more reactive monomers having a boiling point at 1 atmosphere of greater than 100° C., for example, 120, 130, 140, 145 or 150° C. or higher, in some embodiments greater than 160° C., 170° C. or 180° C. In certain embodiments, at least 10, 25 or 50 wt % of the composition is made up of reactive monomers, for example, at least 52, 55, 60 or 65 wt %, and up to 75, 80, 85 or 89 wt % of the composition is reactive monomers. Typically, the reactive monomers have a molecular weight of less than 1000, often less than 500.

The one or more reactive monomers comprise compounds having acrylate or methacrylate moieties, for example, at least 50 mole %, e.g., 60 or 70 mole % and often 75 to 95 or 75 to 100 mole %, of the reactive monomers comprise acrylate or methacrylate moieties.

In general the reactive acrylate or methacrylate monomers are selected from the group consisting of compounds of formula I and compounds comprising two or more reactive groups of formula II,

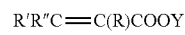     I

     II wherein R, R' and R" are each individually selected from H, $C_{1-12}$ alkyl, $C_{1-6}$ alkyl substituted by phenyl, $C_{1-6}$ alkyl substituted by phenyl substituted by one or more $C_{1-4}$ alkyl, phenyl, and phenyl substituted by one or more $C_{1-4}$alkyl, and Y is H or one of the groups identified for G of formula Ia above, in many embodiments Y selected from H, $C_{1-12}$ alkyl, and $C_{1-6}$ alkyl substituted by phenyl, OR, NRR', or oxirane, i.e., and epoxy group, and/or interrupted by carbonyl, carboxylate, O or NR.

In many embodiments, in the compounds of formula I and those comprising two or more groups of formula II, R, R' and R" are each individually selected from H and methyl and Y is selected from $C_{6-12}$ alkyl, and $C_{2-6}$ alkyl substituted by OR, NRR', or oxirane; and in particular embodiments, R is H or methyl and R' and R" are H, e.g., the reactive monomers comprise acrylate or methacrylate moieties. Many monomers of formula Ia and IIa used to prepared the first polymer of component a) are useful as reactive monomers of component b), but many other known di- and tri-acrylates and methacrylates may also be employed. For example, multifunctional reactive monomers include, but are not limited to, trimethyloylpropane trimethacrylate, 2,2-bis-(4-(3-methacryloxy-2-hydroxypropoxy)phenylpropane, 3,6-dioxaoctamethylene dimethacrylate, and/or 1,4-butanediol dimethacrylate.

Component b) can also contain smaller amounts, i.e., less than 50 mole %, of other monomers that are used along with the above-indicated acrylates etc., for example, acrylamides, vinyl esters, vinyl chlorides, vinyl ethers, vinylidene chlorides, vinyl acetates, certain styrenes, maleic acid derivatives and the like. Again, many of the non-acrylate monomers identified for use in preparing the first polymer of component a) are useful as reactive monomers b), excluding those that are gasses or have an unacceptably low by or those which are excluded due to toxicity as can be readily determined upon review of information available to the chemist, for example, acryloyl chloride, acrylamide, cyanoacrylates, volatile styrenes etc.

Often, the coating compositions of the invention will comprise compounds of formula I and compounds comprising two or more reactive groups of formula II.

Component c)

Thermal and UV activated radical initiators are well known in the art, many of which are commercially available. It is well within the skill of the practitioner to determine the amount of initiator required to achieve proper cure of the coating, but less than 15 wt % and typically 10 wt % or less, e.g., 5 wt % or less, of the composition will be initiator.

Useful thermal initiators include azo compounds, such as azobis-isobutyronitrile and the like; organic peroxides, such as ketone peroxides, hydroperoxides, alkyl peroxides, acyl peroxides, peroxy esters and the like; and inorganic peroxides, such as ammonium persulfate, potassium persulfate, hydrogen peroxide and the like. Useful catalysts for autooxidative cure include the salts of cobalt, such as cobalt acetate, cobalt naphthenate and the like.

Peroxides are often employed as thermal initiators, such as ketone peroxides, diacyl peroxides, per-esters, per-ketals, and mixtures thereof. For example, common peroxy initiators include methyl ethyl ketone peroxide, acetylacetone peroxide, ketone peroxide, methyl isobutyl ketone peroxide, cyclohexanone peroxide, dibenzoyl peroxide, tert-butyl peroxybenzoate, tert-butyl peroxyisopropyl carbonate, 2,5-bis-(2-ethylhexanoylperoxy)-2,5-dimethylhexane, tert-butyl peroxy-2-ethylhexanoate, tert-butyl peroxy-3,5,5-trimethylhexanoate, 1,1-bis-(tert-butyl peroxy)cyclohexane, 1,1-bis-(tert-butyl peroxy)-3,3,5-trimethylcyclohexane, cumylhydroperoxide, tert-butyl hydroperoxide, dicumyl peroxide, bis-(4-tert-butylcyclohexyl) peroxidecarbonate, mixtures of ketone-peroxides, per-esters, as well as mixtures of two or more of the above-mentioned compounds with one another.

Generally, in embodiments wherein a thermal initiator is used, the composition will also comprise a wax or oil of component d) and a tertiary amine of component e).

Radical producing UV activated initiators that initiate free-radical polymerization of unsaturated double bonds upon exposure to UV light and high energy visible light, e.g., light of about 260 to about 480 nm, are well known. UV radiation energy or other form of radiation may be used, but most often UV or high energy visible radiation is used. The actual wavelengths of light used in curing will depend of course on the absorption profile of the photo initiator. Sources of ultraviolet radiation include sunlight, fluorescent lamp, mercury lamp, carbon-arc lamp, xenon lamp and the like, e.g., a mercury vapor lamp. The UV curing energy required is depending upon the film thickness, applied temperature, types of the UV lamp and its housing and types of the formulation.

Useful photoinitiators include cleavage-type initiators, halogenated polynuclear ketones, such as chlorosulfonated-benzanthones, chlorosulfonatedfluorenones, alpha-haloalkylatedbenzanthrones, and alpha-haloalkylatedfluorenone; benzoin, its ethers, such as methyl ether, ethyl ether, isopropyl ether, butyl ether, octyl ether and the like; carbonyl compounds such as diacetyl, benzil and the like; sulfur compounds such diphenyl sulfide, dithiocarbamate and the like; alpha-chloromethyl naphthalene and anthracene. Other useful photoinitiators include alkylphenones and benzophenones. Photoinitiators suitable for pigmented coatings are suggested in U.S. Pat. Nos. 3,915,824 and 3,847,771.

Some specific example of type 1 photo initiators, i.e., photo fragmentation initiators, include benzoin alkyl ethers, benzilketals, acyloxime esters, and acetophenone derivatives, including dialkoxyacetophenones, hydroxyl alkyl ketones, morpholinoketones, chlorinated acetopheneones, acylphosphine oxides and acyl phosphonates. Examples of type 2 photoinitiators, i.e., hydrogen abstraction photoinitiators, include benzil and derivatives, benzophenone and derivatives, and thioxanthenes. Specific examples of photo initiators are benzyldimethylketal, bis(2,6-dimethoxy benzoyl)(2,4,4-trimethyl pentyl)phosphine-oxide, 2-hydroxy-2-methyl-1-phenyl-1-propanone, diphenyl(2,4,6-trimethylbenzoyl) phosphine oxides, 1-hydroxycyclohexyl phenyl ketone, 2-benzyl-2-(dimethylamino)-1-) 4-(4-morpholinyl)phenyl-1-butanone, isopropylthioxanthone, alpha-alpha-dimethoxy-alpha-phenyl-acetophenone, 2-methyl-1-4-(methylthio)phenyl-2-(4-morpholinyl)-1-propanone, 2,2-diethoxyacetophenone, 2-hydroxy-1-4-(hydroxyethoxy)phenyl-2-methyl-1-propanone. Polymer bound photo initiators may be used and often combinations of photo initiators are employed. Commercial examples of photo initiators are well known and readily obtained.

Radical induced photo-curing is also generally more efficient in the absence of oxygen and while the wax or tertiary amine of the invention may be employed, they are not typically needed with the UV cured compositions of the invention.

Component d)

The inert wax or oil of the invention is selected to rise to the surface of the coating either before or during cure to create an oxygen barrier that enables complete free radical curing by preventing oxygen quenching of the radicals. The wax or oil will remain after cure but erosion due to exposure to traffic will cause to wax or oil to wear away. The oxygen barrier is most important in thicker films.

In principle, any substance that forms a homogeneous surface layer formation before or during cure can be used, for example, a paraffin, microcrystalline wax, carnauba wax, beeswax, lanolin, whale oil, a polyolefin wax, ceresin, candelilla wax, etc. Typically, a paraffin, e.g., a paraffin wax is used, in one particular embodiment a paraffin wax with a melting point of from 70 to 200° F., e.g., from 100 to 180° F., or from 110 to 150° F., is used.

Component e)

The tertiary amine of component e) is used as an accelerator for the radical initiator, in particular for thermal initiators such as peroxides. The amines are known and typically commercially available, including various aromatic tertiary amine, such as dimethyl-p-toluidine, diisopropoxy-p-toluidine, N-Ethyl-N-(2-hydroxyethyl)-m-toluidine, N,N-bis-(2-hydroxyethyl)-p-toluidine, 4-dimethylaminobenzoic acid and the like, amine acrylates, trialkylamines, etc.

For example, in one embodiment of the invention the coating composition comprises:
a) 5 to 85 wt % of the reactive acrylic based polymer comprising acrylate or methacrylate pendant groups;
b) 5 to 94 wt % of the one or more reactive monomers having a boiling point at 1 atmosphere of greater than 100° C.
c) 0.1 to 10 wt %, of a thermally activated radical initiator,
d) 0.1 to 15 wt % of an inert wax or oil, and
e) 0.1 to 5 wt % of a tertiary amine,
For example, the coating composition comprises:
a) 10 to 40 wt % of the reactive acrylic based polymer comprising acrylate or methacrylate pendant groups;
b) 50 to 89 wt % of the one or more reactive monomers having a boiling point at 1 atmosphere of greater than 100° C.
c) 0.1 to 10 wt %, of a thermally activated radical initiator,
d) 0.1 to 5 wt % of an inert wax or oil, and
e) 0.1 to 5 wt % of a tertiary amine.

In another embodiment the coating composition comprises:
a) 5 to 85 wt % of the reactive acrylic based polymer comprising acrylate or methacrylate pendant groups;
b) 5 to 94 wt % of the one or more reactive monomers having a boiling point at 1 atmosphere of greater than 100° C., and
c) 0.1 to 10 wt %, of a UV activated radical initiator.
For example, the coating composition comprises:
a) 10 to 40 wt % of the reactive acrylic based polymer comprising acrylate or methacrylate pendant groups;
b) 50 to 89 wt % of the one or more reactive monomers having a boiling point at 1 atmosphere of greater than 140° C.
c) 0.1 to 10 wt %, of a UV activated radical initiator.

Coating compositions of the invention often comprise one or more fillers and other additives in addition to components a) through e). These include, for example, organic fillers, inorganic fillers. pigments, dyes, anti-slip agents, anti static agents, adhesion promoters, tackifiers, plasticizers, flow aids, wetting aids, rheology modifiers, nucleating agents, photo synergists, stabilizers, leveling agents, defoamer/air releasing agents, inhibitors to prevent premature cure, and the like. For example, the coatings may be formulated with cement, aggregates, sands, quartz (colored or non colored), metal salts such as CaCO3, CaSO4, BaSO4, etc., ultraviolet absorbers, hindered amine light stabilizers, antioxidants, surfactants, dispersants, matting agent, etc.

Inhibitors such as MEHQ and BHT may be used to balance the curing rate and film formation time to allow for a reasonable amount of time to complete the formulation and properly apply the coating.

Coated articles of the invention include but are not limited to countertops, floors, flooring panels, doors, architectural panels, decorative panels, automotive applications, ceramics, tiles, concrete and other masonry.

Floors, such as concrete floors coated by the composition of the invention typically comprise one or more, typically each of the following structural elements:

1) Primer/sealer (coated directly to the concrete)—typically 10 mil to 15 mil;

2) Body coat (can be used alone or broadcasted)—typically 15-100 mils or thicker, one, two or more layers may be applied, in some embodiments multiple layers of 15-50 mils are applied. Broadcast means to apply liquid coatings and then cover the liquid coating either with decorative microchips of vinyl or colored/none colored sands;

3) Top coat—15-30 mil and sometimes thicker, can comprise one or two such layers.

The coating composition of the invention may be used in any of the structural elements, often all three. For example, floor coatings of present invention can be used as primer, sealer, patch, intermediate coat, broadcast coat and top coat. Techniques for applying the coating include roller coating, curtain coating, spraying and any other common method utilized in the floor and wall coatings.

The formulations are useful in applications which require low odor, toxicity and viscosity, such as, for example, paints, including wood coat, polyvinyl chloride flooring; concrete floor, metals and other common substrates. Embodiments of the invention pertain to the coating compositions, process for preparing the coating compositions, applying the coating compositions and the curing thereof, and articles comprising a coating of the invention.

EXAMPLES

Preparation of Component a)—Reactive Acrylic Polymer Comprising Pendant Acrylate or Methacrylate Groups A first acrylate polymer is prepared by adding to 1,200 grams of refluxing isopropanol and 430 grams of methyl methacrylate (56.5% by weight of monomers added), 23 grams of glacial acrylic acid (3.5% by weight of monomers added), and 328 grams of butyl acrylate (40% by weight of monomers added) followed by addition of 18 grams of 2,2-azobis(2-methylbutyronitrile). The mixture was stirred and gradually heated to 120° C. over three hours and then the reaction was allowed to cool. The reaction mixture was then treated with an additional 2.7 grams of 2,2-azobis(2-methylbutyronitrile), thinned with 40 grams ethyl acetate and heated to complete the reaction.

To one half of the first polymer is mixture is added 30 grams glycidylmethacrylate, the reaction temperature is adjusted to 105° C., 0.5 grams of BHT and 5.2 grams of triethyl amine are added. After completion of the reaction excess monomer, solvents and volatiles are removed at reduced pressure to yield the reactive polymer of the invention as a clear, colorless to yellow resin.

Following the procedure above, reactive polymers comprising the monomers of the following table were prepared.

TABLE I

Precursor First Polymer Composition, Wt %

| Ex | EHA | MA | MMA | BA | GAA | GMA | Tg ° C. (Fox Cal'd) |
|---|---|---|---|---|---|---|---|
| 1 | | | 56.5 | 40 | 3.5 | 1.05% | 21 |
| 2 | 22 | | 68 | | 10 | 1.03% | 52.5 |
| 3 | 60 | 30 | | | 10 | 1.03% | −28 |
| 4 | 27 | 70 | | | 3 | 1.03% | −10.4 |
| 5 | | | 41 | 55 | 4 | 1.03% | −1.2 |
| 6 | | | 46 | 50 | 4 | 1.03% | 5.9 |
| 7 | | | 46 | 49 | 5 | 1.02% | 7.4 |
| 8 | | | 50 | 46 | 4 | 1.06% | 11.9 |
| 9 | | | 60 | 38 | 2 | 1.05% | 24.7 |
| 10 | | | 55 | 42 | 3 | 1.05% | 18.2 |

EHA—Ethyl acrylate
MA—Methyl acrylate
MMA—Methyl methacrylate
BA—Butyl acrylate
GAA—Glacial acrylic acid
GMA—Glycidyl methacrylate Film Curing The above reactive polymers are formulated into thermal cure and UV cure floor coating compositions of the present invention, which compositions are applied and cured at room temperature.

Thermal Cure

Thermal cure coating compositions were prepared by blending the polymer of Example 1 with methacrylate monomers, paraffin wax and tertiary amine as shown in the table below. Immediately before application a peroxy thermal initiator is added and the mixture is stirred to be uniform and coating layers are formed. All operations are carried out at room temperature. For comparison, a methacrylate composition of the art is formed and cured.

TABLE II

Thermal cure Floor Coating Compositions, wt %

| Sample | MMA | TEG-DMA | HET | BHT | Bead Polymer |
|---|---|---|---|---|---|
| Comparison | 75 | 6 | 1 | 0.07 | 17 |

| | Polymer Ex1 | HEMA | TMPTDMA | DEGDMA | b-PTE | paraffin wax |
|---|---|---|---|---|---|---|
| Ex 11 | 29.6 | — | 39.5 | 29.6 | 1 | 0.35 |
| EX 12 | 30 | 20 | 13 | 37 | 1 | 0.35 |

MMA—Methyl methacrylate
HEMA—Hydroxyl ethyl methacrylate
TMPTMA—Trimethylolpropanetriacrylate
DEGDMA—Diethylenedimethacrylate
TEGDMA—Triethylenedimethacrylate
HET—Hydroxyethyl p-toluidine
Bead Polymer—High molecular weight methacrylate polymer (not reactive)
b-PTE—N,N-bis-(2-hydroxyethyl)-para-toluidine
Paraffin Wax with melting point of 125° F.-130° F.

Properties of the thermal cure coatings are shown in Table III. Pot life is measured from right after the initiator mixed in homogeneously to the point at that time the formulation is not pourable.

TABLE III

Floor Coating Film Curing Properties

| | Ex 11 | Ex 12 | Comp |
|---|---|---|---|
| Pot life (min.) | 7 | 7 | 20 |
| Tack Free (min.) | 18 | 18 | 40 |
| Curing % | 100% | 100% | 100% |

TABLE III-continued

Floor Coating Film Curing Properties

| | Ex 11 | Ex 12 | Comp |
|---|---|---|---|
| Film Clarity | no haze | no haze | no haze |
| Short D Hardness | 75 | 80 | 80 |
| Formulation odor | mild | mild | Strong |
| Betadine Resistance, >24 hrs | NS | NS | NS |
| 15% Ethanol Resistance | NS | NS | S |
| DOT 4 Brake Fluid Resistance | NS | NS | S |

NS—No stain to the cured film
S—Stain to the film

UV Cure

UV cure coating compositions were prepared by blending the polymer of Example 1 with methacrylate and acrylate monomers, and photo-initiators as shown in table IV below. The mixture is stirred to be uniform and coating layers are formed and subjected to UV light as shown in Table V. All operations are carried out at room temperature.

TABLE IV

UV-Curable Floor Formulations of the Present Invention

| | EX 1 | HEMA | ITA | TMPTMA | DEGDMA | I-184 | I-819 |
|---|---|---|---|---|---|---|---|
| Ex 13 | 30 | 30 | — | — | 40 | 2.2 | 0.2 |
| Ex 14 | 30 | 35 | — | 12.1 | 18 | 2.2 | 0.2 |
| Ex 15 | 30 | 25 | 15 | — | 30 | 2.2 | 0.2 |

ITA—Isocyanuratetriacrylate
I-184—Irgacure I-184, 1-Hydroxy-cyclohexyl-phenyl-ketone
I-819—Irgacure I-819, Bis(2,4,6-trimethylbenzoyl)-phenylphosphineoxide Table V Properties of UV curable formulation of present invention

TABLE V

UV Cured Film Property

| | UVC Energy* | Film Thickness | Abrasion (mg lost) | Betadine | Iso-PrOH | DOT 4 Brake Fluid |
|---|---|---|---|---|---|---|
| Ex 13 | 50 mJ/cm2 | 5-10 mil | 77.9 | NS | NS | NS |
| Ex 14 | 50 mJ/cm2 | 5-10 | 82.6 | NS | NS | NS |
| Ex 15 | 50 mJ/cm2 | 5-10 | 67.2 | NS | NS | NS |

All films are cured by metal halide bulb and its energy is estimated around 50 mJ/cm2 on UVC.

The invention claimed is:

1. A liquid coating composition comprising
a) from 10 to 40 wt %, based on the weight of components a) through e), of an acrylic based polymer comprising acrylate or methacrylate pendant groups prepared by reacting glycidyl acrylate and/or glycidyl methacrylate with a co-polymer prepared from a mixture of monomers comprising at least one acrylic and/or methacrylic acid monomer and one or more monomers of formula Ia and/or IIa, $$R'R''C=C(R)COOG \qquad \text{Ia}$$

$$R'R''C=C(R)COO)_n-Z, \qquad \text{IIa}$$

wherein R, R' and R" are independently selected from methyl and hydrogen;
G is $C_{1-18}$, straight or branched chain saturated alkyl; $C_{2-12}$, straight or branched chain unsaturated alkyl; said alkyl or unsaturated alkyl substituted by OH, OR, $NR_2$ and/or interrupted by one or more carbonyl, carboxylate, O or NR; $C_{3-12}$epoxyalkyl; phenyl; phenyl substituted by alkyl, alkoxy or amino; benzyl; benzyl substituted by alkyl, alkoxy or amino; phenethyl; phenethyl substituted by alkyl, alkoxy or amino alcohol;
n is 2 or 3, and
Z is straight or branched chain $C_{2-12}$alkyl or $C_{2-12}$alkyl substituted by OH, OR, or $NR_2$ and/or interrupted by one or more carbonyl, carboxylate, O or NR, e.g., $C_{4-24}$ alkyl or $C_{4-24}$ alkyl substituted by OH, OR, $NR_2$ and/or interrupted by one or more carbonyl, carboxylate, O or NR;
b) from 50 to 89 wt % of one or more reactive monomers having a boiling point at 1 atmosphere of greater than 100° C. wherein at least 50 mole % of the reactive monomers are selected from the group consisting of compounds of formula I $$R'R''C=C(R)COOY \qquad \text{Formula I}$$

and compounds comprising two or more reactive groups of formula II, $$R'R''C=C(R)COO-, \qquad \text{Formula II:}$$

wherein R, R' and R" are each individually selected from H, $C_{1-12}$ alkyl, $C_{1-6}$ alkyl substituted by phenyl, $C_{1-6}$ alkyl substituted by phenyl substituted by one or more $C_{1-4}$ alkyl, phenyl, and phenyl substituted by one or more $C_{1-4}$alkyl, and
Y is selected from H, $C_{1-18}$, straight or branched chain saturated alkyl; $C_{2-12}$, straight or branched chain unsaturated alkyl; said alkyl or unsaturated alkyl substituted by OH, OR, $NR_2$ and/or interrupted by one or more carbonyl, carboxylate, O or NR; $C_{3-12}$epoxyalkyl; phenyl; phenyl substituted by alkyl, alkoxy or amino; benzyl; benzyl substituted by alkyl, alkoxy or amino; phenethyl; phenethyl substituted by alkyl, alkoxy or amino alcohol
c) 0.1 to 10 wt % of a thermally activated or UV activated radical initiator,
d) 0 to 10 wt % of a non-polar, inert wax or oil, and
e) 0 to 5 wt % of a tertiary amine,
wherein the coating composition has a viscosity of 50,000 cps or less at 25° C.

2. The coating composition according to claim 1 wherein at least 50 mole % of the monomer mixture is made up of acrylic and/or methacrylic esters and acids.

3. The coating composition according to claim 2, wherein 60 wt % or more of the monomers of formula Ia and IIa are monomers of formula Ia.

4. The coating composition according to claim 3, wherein 80 wt % or more of the monomers of formula Ia and IIa are monomers of formula Ia.

5. The coating composition according to claim 1, wherein in Formula Ia G is $C_{1-6}$ straight or branched chain saturated alkyl; $C_{2-6}$ straight or branched chain unsaturated alkyl; said alkyl or unsaturated alkyl substituted by OH, $NR_2$ and/or interrupted by one or more O or NR; or $C_{3-12}$epoxyalkyl.

6. The coating composition according to claim 1 wherein the compounds of formula I and the compounds comprising two or moieties of formula II of component b), R, R' and R" are each individually selected from H and methyl and Y is selected from $C_{6-12}$ alkyl, and $C_{2-6}$ alkyl substituted by OR, NRR', or oxirane.

7. The coating composition according to claim 6 wherein in the compounds of formula I and the compounds comprising two or moieties of formula IIII, R and R' are H.

8. The coating composition according to claim 1 wherein the wax or oil is a paraffin wax.

9. The coating composition according to claim 1 wherein component b) comprises at least one compound of formula I and at least one compound comprising two or more reactive groups of formula II.

10. The liquid coating composition according to claim 1 comprising
a) from 10 to 40 wt %, based on the weight of components a) through e), of an acrylic based polymer comprising acrylate or methacrylate pendant groups prepared by reacting glycidyl acrylate and/or glycidyl methacrylate with a co-polymer prepared from a mixture of monomers comprising at least one acrylic and/or methacrylic acid monomer and one or more monomers of formula Ia and/or IIa, $$R'R''C=C(R)COOG \qquad \text{Ia}$$

$$R'R''C=C(R)COO)_n-Z, \qquad \text{IIa}$$

wherein R, R' and R" are independently selected from methyl and hydrogen;
G is $C_{1-12}$straight or branched chain saturated alkyl; $C_{2-12}$ straight or branched chain unsaturated alkyl; $C_{2-12}$ said alkyl or unsaturated alkyl substituted by OH, $NR_2$ and/or interrupted by one or more O or NR; $C_{3-12}$epoxyalkyl; phenyl; phenyl substituted by alkyl, alkoxy or amino; benzyl;
benzyl substituted by alkyl, alkoxy or amino; phenethyl; phenethyl substituted by alkyl, alkoxy or amino alcohol; and the like; n is 2 or 3; and
Z is straight or branched chain $C_{2-12}$alkyl, $C_{4-24}$ alkyl interrupted by one or more O or $NR_2$, Wherein at least 90 mole % of the monomer mixture is made up of acrylic and/or methacrylic esters and acids;

b) from 50 to 89 wt % of one or more reactive monomers having a boiling point at 1 atmosphere of greater than 100° C. selected from the group consisting of compounds of formula I R'R"C=C(R)COOY          Formula I and compounds comprising two or more reactive groups of formula II, R'R"C=C(R)COO—,          Formula II:

and wherein R, R' and R" are each individually selected from H, $C_{1-12}$ alkyl, $C_{1-6}$ alkyl substituted by phenyl, $C_{1-6}$ alkyl substituted by phenyl substituted by one or more $C_{1-4}$ alkyl, phenyl, and phenyl substituted by one or more $C_{1-4}$ alkyl, and Y is selected from H, $C_{1-12}$ alkyl, and $C_{1-6}$ alkyl substituted by phenyl, OR, NRR', or oxirane;

c) 0.1 to 10 wt % of a thermally activated or UV activated radical initiator, d) 0 to 5 wt % of a non-polar, inert wax or oil, and e) 0 to 5 wt % of a tertiary amine, wherein 60 wt % or more of the monomers of formula Ia and IIa are monomers of formula Ia and wherein the coating composition has a viscosity of less than 10,000 cps at 25° C.

11. The coating composition according to claim 1 comprising a) 10 to 40 wt %, of the acrylic based polymer comprising acrylate or methacrylate pendant groups;

b) 50 to 89 wt % of the one or more reactive monomers having a boiling point at 1 atmosphere of greater than 100° C.

c) 0.1 to 10 wt %, of a thermally activated radical initiator, d) 0.1 to 5 wt % of an inert wax or oil, and e) 0.1 to 5 wt % of a tertiary amine.

12. A substrate coated with film obtained by curing the coating composition of claim 11.

13. The coating composition according to claim 12 wherein the acrylic polymer comprising acrylate or methacrylate pendant groups has a molecular wt of less than Mn 1900.

14. A flooring material coated with a 5 to 60 micron film obtained by curing the coating composition of claim 11.

15. The coating composition according to claim 1 comprising a) 10 to 40 wt % of the acrylic polymer comprising acrylate or methacrylate pendant groups;

b) 50 to 89 wt % of the one or more reactive monomers having a boiling point at 1 atmosphere of greater than 100° C.

c) 0.1 to 10 wt %, of a UV activated radical initiator, d) 0 to 5 wt % of an inert wax or oil, and e) 0 to 5 wt % of a tertiary amine.

16. A substrate coated with a film obtained by curing the coating composition of claim 15.

17. A flooring material coated with film obtained by curing the coating composition of claim 15.

18. The coating composition according to claim 15 having a viscosity of 50-7,500 cps at 25° C.

19. The coating composition according to claim 1 wherein the acrylic polymer comprising acrylate or methacrylate pendant groups has a molecular wt of less than Mn 1900.

20. A process for coating a flooring material comprising apply a coating composition of claim 1 to a floor or material used in preparing a floor, and then allowing the coating to cure at room temperature or exposing the coating to UV radiation and allowing the coating to cure at room temperature.

* * * * *